US007543971B2

(12) United States Patent
Lee et al.

(10) Patent No.: US 7,543,971 B2
(45) Date of Patent: Jun. 9, 2009

(54) LIGHT GUIDE FOR USE IN A KEYPAD

(75) Inventors: Kun-Neng Lee, Taipei (TW); Yi-Hsiang Tseng, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 272 days.

(21) Appl. No.: 11/723,377

(22) Filed: Mar. 16, 2007

(65) Prior Publication Data
US 2008/0101083 A1 May 1, 2008

(30) Foreign Application Priority Data
Oct. 27, 2006 (TW) .............................. 95219036 U

(51) Int. Cl.
*F21V 7/04* (2006.01)
(52) U.S. Cl. ............................. 362/616; 362/85; 362/30
(58) Field of Classification Search .................. 362/26, 362/27, 29, 30, 85, 86, 88, 95, 227, 236, 362/238, 246, 247, 295–297, 308–311, 326, 362/327, 330, 600, 602, 611–616, 621, 623; 200/310
See application file for complete search history.

(56) References Cited

U.S. PATENT DOCUMENTS

| 4,343,975 | A | * | 8/1982 | Sado | ........................... 200/314 |
| 5,746,493 | A | * | 5/1998 | Jonsson et al. | .............. 362/602 |
| 6,026,283 | A | * | 2/2000 | Stephenson | .............. 455/575.1 |
| 7,407,314 | B2 | * | 8/2008 | Hsu et al. | ................... 362/610 |
| 2007/0062793 | A1 | * | 3/2007 | Hung | ........................ 200/310 |

FOREIGN PATENT DOCUMENTS

TW M266654 U 6/2005

* cited by examiner

*Primary Examiner*—Hargobind S Sawhney
(74) *Attorney, Agent, or Firm*—Rosenberg, Klein & Lee

(57) ABSTRACT

A light guide for a keypad includes a plurality of through hole portions adapted to correspond respectively to keys on the keypad. Each of the through hole portions is adapted to receive at least a part of the corresponding key, and to receive light incident thereinto from at least one light source. Each of selected ones of the through hole portions has a contour with a non-curved contour portion that includes a light incident face and a reflecting face forming an angle with the light incident face. Light incident on the reflecting face is reflected into at least one other through hole portion. The light guide can also be configured to have a tree-like structure.

23 Claims, 5 Drawing Sheets

LIGHT GUIDE FOR USE IN A KEYPAD

CROSS-REFERENCE TO RELATED APPLICATION

This application claims priority of Taiwanese Application No. 095219036, filed on Oct. 27, 2006.

BACKGROUND OF THE INVENTION

1. Field of the Invention

The invention relates to a light guide, more particularly to a light guide for use in a keypad.

2. Description of the Related Art

Referring to FIG. 1, R.O.C. Utility Model Publication No. 266654 discloses a light guide 1 for a mobile phone keypad. The light guide 1 is used in combination with a light emitting diode (LED) 19 disposed proximate to a lateral edge of the light guide 1 such that keys (not shown) on a keypad disposed on an upper side of the light guide 1 are illuminated.

Light emitted from the LED 19 is reflected by peripheral walls 111 defining a plurality of holes 11 before it is incident into a hole 12 which is farthest from the LED 19. However, when the light is incident on a spot of the peripheral wall 111, some of the light is reflected thereby while the rest passes therethrough into the hole 11. Therefore, if the light is reflected by the peripheral walls 111 of a greater number of holes 11, the intensity of the light will be weakened, so that the intensity of the light incident into the hole 12 farthest from the LED 19 is weakest. Since the peripheral wall 111 of each hole 11 in the light guide 1 functions to both admit light and reflect light at every spot, and is not provided with any particular proportion of light admission to light reflection, and since there is not any special design with respect to the angle of incident light, light emitted from the LED 19 cannot reach the hole 12 farthest from the LED 19 directly or through a single reflection, thereby resulting in a weaker intensity of the light in the hole 12 farthest from the LED 19, and non-uniform distribution of light among the holes 11, 12. Thus, the brightness of the light illuminating the keys on the keypad is inconsistent.

SUMMARY OF THE INVENTION

Accordingly, the object of the present invention is to provide a light guide that permits uniform illumination of all the keys on a keypad while using a small number of light sources.

The light guide for use in a keypad of this invention includes a plurality of through hole portions, in which each of selected ones of the through hole portions has a contour with a non-curved contour portion. A portion of light incident on the non-curved contour portion of one through hole portion is reflected to at least one other through hole portion. The non-curved contour portion is preferably a linear segment.

Accordingly, the light guide for use in a keypad of this invention includes a plurality of through hole portions adapted to correspond respectively to keys on the keypad, each of the through hole portions being adapted to receive at least a part of the corresponding key. The light guide defines a proximate end and a distal end. The through hole portions are arranged in three rows extending from the proximate end to the distal end along a respective row line, and including a left row, a right row, and a middle row between the left and right rows. Two light sources are disposed adjacent to the proximate end, with one light source disposed between the row lines of the left and middle rows, and the other disposed between the row lines of the middle and right rows. Light emitted from the two light sources is incident into each of the through hole portions. Each of selected ones of the through hole portions has a contour with a non-curved contour portion. A portion of the light incident on the non-curved contour portion is reflected to at least one other through hole portion.

The contour of each selected one of the through hole portions includes at least one light incident face slanting toward the proximate end, and at least one reflecting face forming an angle with the light incident face. The light incident faces increase in size from the proximate end to the distal end, whereas the reflecting faces decrease in size from the proximate end to the distal end. Light incident on the light incident face is refracted into the corresponding through hole portion. Light incident on the reflecting face is reflected thereby into the other through hole portions.

Since one of the light sources is disposed between the row lines of the left and middle rows and the other of the light sources is disposed between the row lines of the middle and right rows, most of the through hole portions of the light guide receive light directly incident thereinto from the light sources. The rest receive light that is reflected by the reflecting face of one through hole portion. Therefore, more light can enter into the through hole portions that are adjacent to the distal end.

Accordingly, the light guide for use in a keypad may have a substantially tree-like structure, and includes at least one primary passage portion, a plurality of secondary passage portions, and a plurality of through hole portions.

The primary passage portion has a proximate end and a distal end such that light emitted from at least one light source disposed adjacent to the proximate end is transmitted through the primary passage portion to the distal end. Each of the secondary passage portions branches from two opposite sides of the primary passage portion in a spaced-apart relationship, and the secondary passage portions which are adjacent to the proximate end are narrower than the secondary passage portions which are distal from the proximate end. The secondary passage portions permit entry of light in the primary passage portion thereinto such that the light can travel to distal ends of the secondary passage portions. Each of the through hole portions is disposed at the distal end of a respective secondary passage portion, and is adapted to correspond to a key on the keypad. Each of the through hole portions is adapted to receive at least a part of the corresponding key. Light in the secondary passage portions is incident into the corresponding through hole portions.

In the present invention, since the light incident faces of the through hole portions in the first embodiment of the light guide increase in size from the proximate end of the light guide to the distal end thereof, since the reflecting faces of the through hole portions decrease in size from the proximate end of the light guide to the distal end thereof, and since the secondary passage portions in the second embodiment of the light guide are narrower near the proximate end of the primary passage portion than those near the distal end thereof, excess light from the light sources can be prevented from entering the through hole portions near the proximate end of the light guide to ensure that there is sufficient light entering the through hole portions near the distal end of the light guide.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
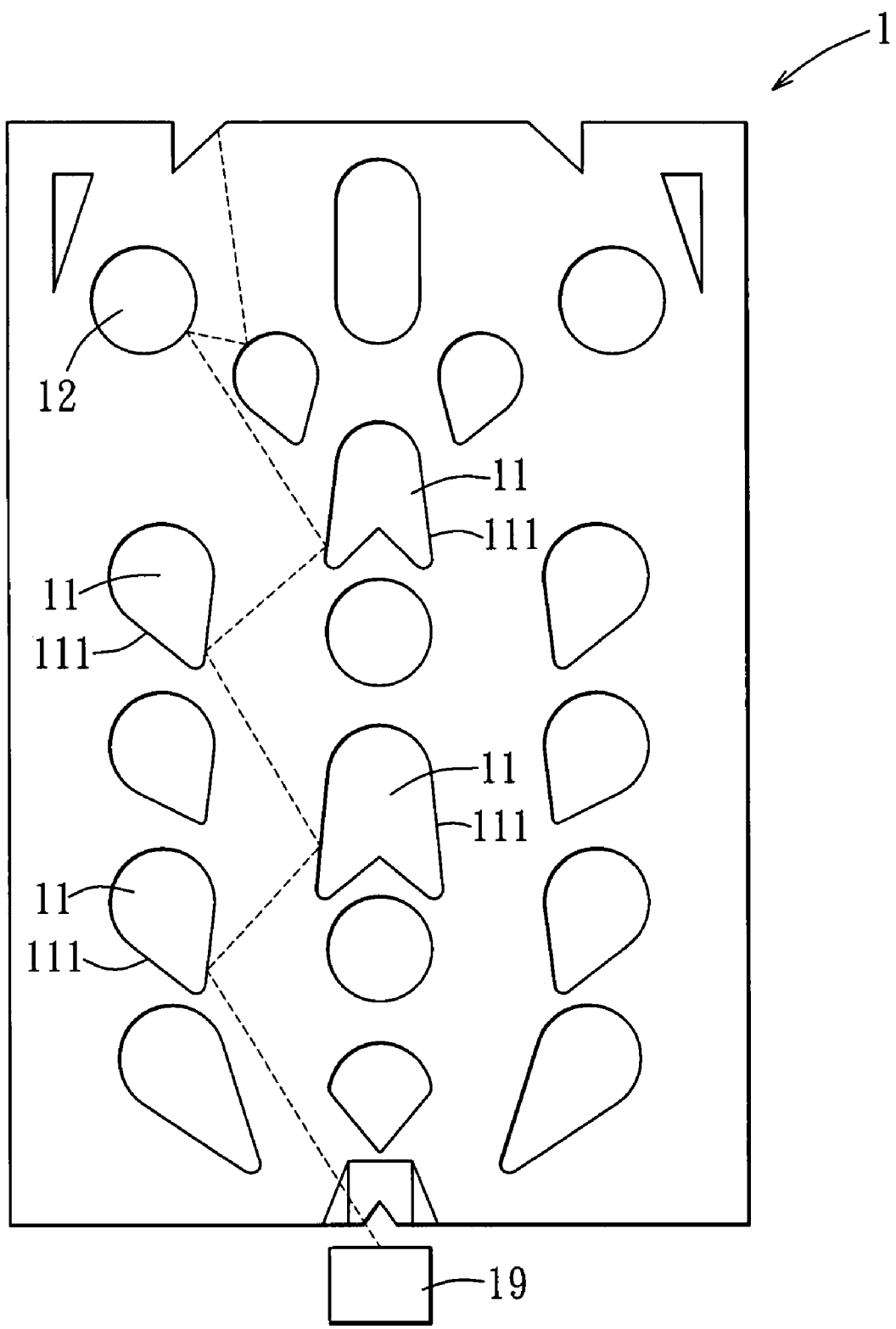
FIG. 1 is a top view to illustrate a conventional light guide for use in a keypad of a mobile phone.
Figure 2:
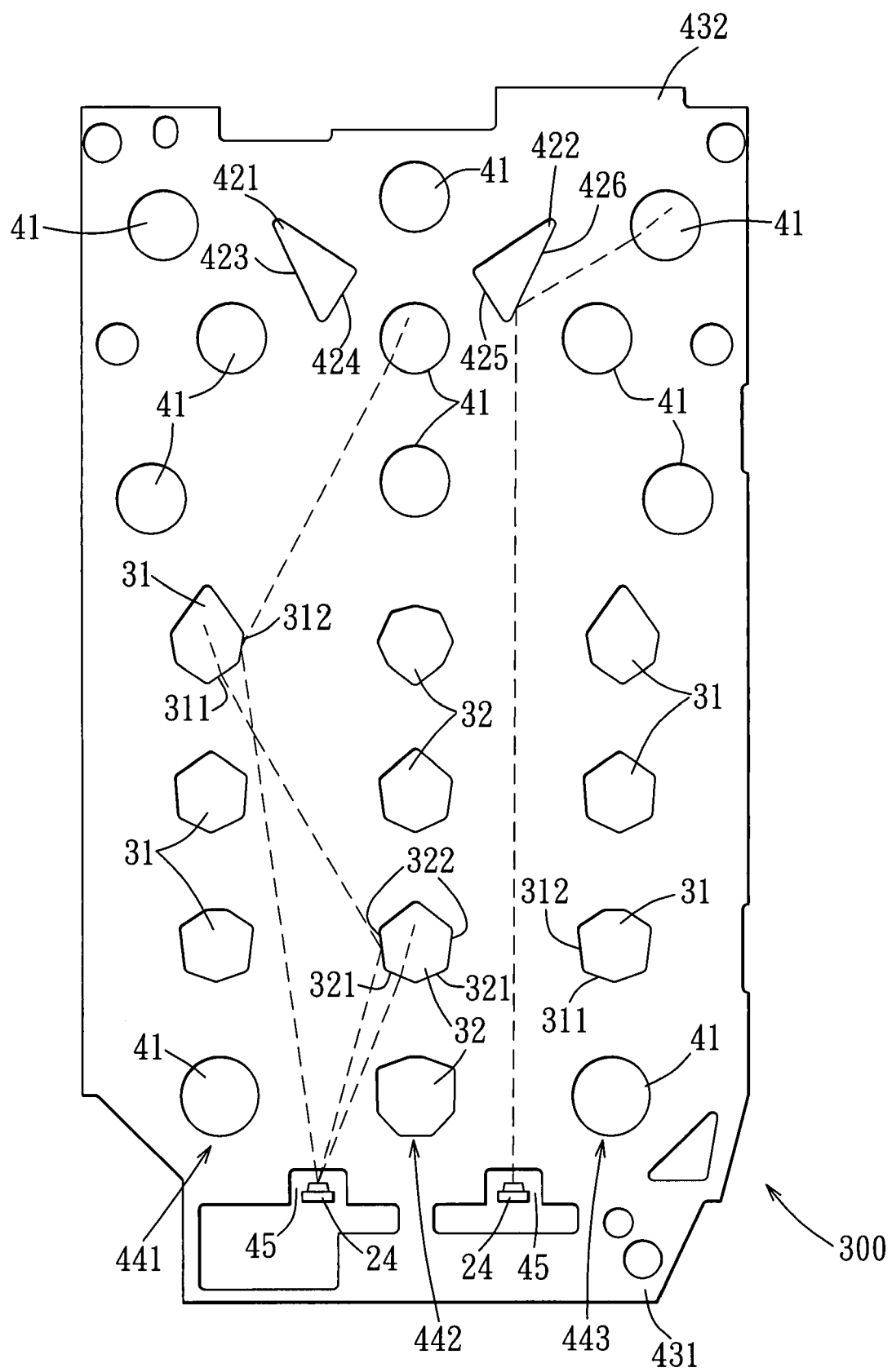
FIG. 2 is a top view to illustrate the first preferred embodiment of a light guide for use in a keypad according to the present invention.
Figure 3:
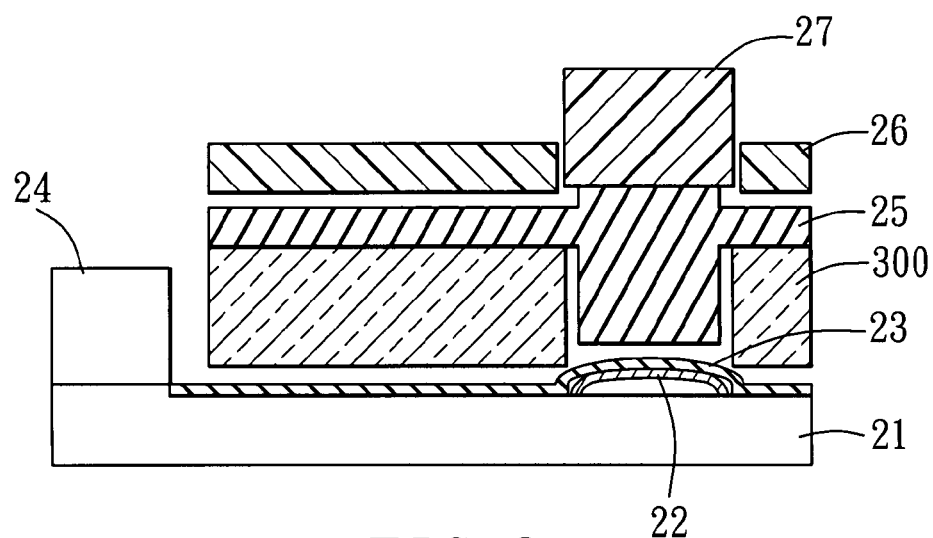
FIG. 3 is a sectional side view to illustrate the relationship of the first preferred embodiment with other components of a mobile phone employing the first preferred embodiment.

Referring to FIG. 2, the first preferred embodiment of a light guide 300 for use in a keypad according to the present invention is adapted for illuminating keys on a keypad of an electronic device, such as a mobile phone. FIG. 3 illustrates an example of the positional relationship between the light guide 300 and other components of the mobile phone. As shown, a circuit board 21 is provided with a plurality of metal domes 22 (only one is shown) and a polyethylene terephthalate (PET) film 23. An electrical connection is established between the metal dome 22 and the circuit board 21 upon pressing of the metal dome 22. The light guide 300 is disposed on the PET film 23. Two light emitting diodes (LED) 24 (only one is shown in FIG. 3) are disposed proximate to one end of the light guide 300. Light emitted from each LED 24 is incident into the light guide 300 from a lateral part of the light guide 300. A silicone rubber pad 25, a light shielding sheet 26, and a keypad having a plurality of keys 27 (only one is shown in FIG. 3) are disposed in sequence on an upper side of the light guide 300.

Referring to FIG. 2 and FIG. 3, the light guide 300 includes a plurality of polygonal through hole portions 31, 32, a plurality of cylindrical through hole portions 41, and two triangular through hole portions 421, 422.

The light guide 300 defines a proximate end 431 and a distal end 432. Each of the polygonal through hole portions 31, 32 and the cylindrical through hole portions 41 corresponds to one of the keys 27, and receives at least a portion of the corresponding key 27. The polygonal through hole portions 31, 32 and the cylindrical through hole portions 41 are arranged in three rows: a left row 441, a right row 443, and a middle row 442 between the left and right rows 441, 443. Each row 441, 442, 443 extends from the proximate end 431 to the distal end 432 along a respective row line. The positions of the keys 27 and their corresponding through hole portions 31, 32, 41 can be adjusted according to different mobile phone models. For example, in this embodiment, the two through hole portions 41 in the left and right rows 441, 443 closest to the proximate end 431 are cylindrical while the other ten through hole portions 31, 32 adjacent to the proximate end 431 are polygonal. It is noted that the cylindrical through hole portions 41 can be configured to be polygonal in shape in other embodiments of this invention.

Each of the polygonal through hole portions 31 in the left and right rows 441, 443 has a contour with a light incident face 311 slanting toward the proximate end 431, and a reflecting face 312 forming an angle with the light incident face 311 and oriented toward the middle row 442. Each of the polygonal through hole portions 32 in the middle row 442 is a regular polygon with symmetrical left and right sides, and has a contour with two light incident faces 321 that slant toward the proximate end 431, and two reflecting faces 322 each of which is contiguous to and forms an angle with a corresponding one of the light incident faces 321. The two reflecting faces 322 of each of the polygonal through hole portions 32 in the middle row 442 are oriented to the left and right rows 441, 443, respectively. In addition, the light incident faces 311, 321 increase in size from the proximate end 431 to the distal end 432, whereas the reflecting faces 312, 322 decrease in size from the proximate end 431 to the distal end 432.

It is noted that the through hole portions 31, 32 may not be polygonal in shape, and may instead have a non-curved contour portion such that the through hole portions 31, 32 have the aforesaid light incident faces 311, 321 and the reflecting faces 312, 322 at the required positions. In this case, the rest of the contour of the through hole portions 31, 32 may be curved.

The two triangular through hole portions 421, 422 are disposed adjacent to the distal end 432, with one located between the left row 441 and the middle row 442, and the other located between the middle row 442 and the right row 443. One of the triangular through hole portions 421 includes two reflecting faces 423, 424 that slant toward the proximate end 431. The other of the triangular through hole portions 422 likewise has two reflecting faces 425, 426 that slant toward the proximate end 431. As the triangular through hole portions 421, 422 are provided to reflect light for light guiding purposes, keys are not provided to correspond thereto.

Two LED receiving holes 45 are formed in the lateral part of the light guide 300 at corresponding positions for respectively receiving the LEDs 24, such that one of the LEDs 24 is located among the proximate end 431 and the through hole portions 41, 32 in the left and middle rows 441, 442 (i.e., between the row lines of the left and middle rows 441, 442), while the other of the LEDs 24 is located among the proximate end 431 and the through hole portions 32, 41 in the middle and right rows 442, 443 (i.e., between the row lines of the middle and right rows 442, 443). On the other hand, the LED receiving holes 45 may be omitted, and the LEDs 24 are disposed to confront a lateral edge of the light guide 300 adjacent to the proximate end 431 in other embodiments of the invention. Moreover, more LEDs 24 can be provided, and are preferably positioned symmetrically.

Light emitted from the LEDs 24 are respectively incident into the through hole portions 31, 32, 41, 421, 422. The arrangement of the light incident faces 311, 321 of the polygonal through hole portions 31, 32 is such that an angle of incidence of light emitted from the corresponding LED 24 and incident directly on the light incident face 311, 321 is smaller than a critical angle of total internal reflection of the light incident face 311, 321, so that some of the energy of the light incident on the light incident face 311, 321 can be refracted into the corresponding polygonal through hole portion 31, 32. On the other hand, the arrangement of the reflecting faces 312, 322 of the polygonal through hole portions 31, 32 is such that an angle of incidence of light emitted from the corresponding LED 24 and incident directly on the reflecting face 312, 322 is larger than a critical angle of total internal reflection of the reflecting face 312, 322, so that the light incident on the reflecting face 312, 322 can be reflected completely due to total internal reflection, and can be preferably reflected onto the light incident faces 311, 321 of the other polygonal through hole portions 31, 32 or into the cylindrical through hole portions 41.

In this embodiment, the light guide 300 is formed from polycarbonate (PC), polymethyl methacrylate (PMMA, commonly known as acrylic), or other suitable light-transmissive materials. If the light guide 300 is formed from a PC material, the refractive index of the light guide 300 is 1.584. Therefore, the critical angles of total internal reflection of the light incident faces 311, 321 and the reflecting faces 312, 322 are all equal to 39 degrees. If the light guide 300 is formed from PMMA, the refractive index of the light guide 300 is 1.492. Therefore, the critical angles of total internal reflection of the light incident faces 311, 321 and the reflecting faces 312, 322 are all equal to 42 degrees.

In this embodiment, due to the layout of the keys 27, the cylindrical through hole portions 41 which are closest to the distal end 432 in the left and right rows 441, 443 are partly blocked by the cylindrical through hole portion 41 closest thereto in the same row, so that there is not sufficient light incident thereinto. Thus, the arrangement of the reflecting faces 423, 426 of the triangular through hole portions 421, 422 help reflect the light to the cylindrical through hole portions 41 which are closest to the distal end 432 in the left and right rows 441, 443. Moreover, the angles of the reflecting faces 423, 426 are such that total internal reflection can occur. However, if the layout of the keys 27 is such that the cylindrical through hole portions 41 which are closest to the distal end 432 in the left and right rows 441, 443 are not blocked, a preferred state can be had. That is, the light emitted from the LEDs 24 can be directly incident into the cylindrical through hole portions 41 closest to the distal end 432, or the light can be incident thereinto through a single reflection, thereby dispensing with the need to provide the triangular through hole portions 421, 422.

Therefore, preferably, all the polygonal through hole portions 31, 32 and the cylindrical through hole portions 41 at least receive once-reflected light from the LEDs 24. Some may even have light directly incident thereinto. Therefore, even the cylindrical through hole portions 41 closest to the distal end 432 may still have sufficient light incident thereinto. In other words, all of the polygonal through hole portions 31, 32 and the cylindrical through hole portions 41 will have sufficient light incident thereinto.

Furthermore, since the light incident faces 311, 321 of the polygonal through hole portions 31, 32 in the left, middle and right rows 441, 442, 443 increase in size from the proximate end 431 to the distal end 432, and since the reflecting faces 312, 322 in the left, middle and right rows 441, 442, 443 decrease in size from the proximate end 431 to the distal end 432, there will not be too much light going into the polygonal through hole portions 31, 32 near the proximate end 431 by way of the light incident faces 311, 321. Besides, since the reflecting faces 312, 322 near the proximate end 431 are sufficiently large, there will be a sufficient amount of light reflected into the through hole portions 31, 32, 41 near the distal end 432. Conversely, since the light incident faces 311, 321 near the distal end 432 are relatively larger, a larger amount of light, whose energy has become weak, can be incident thereon. Thus, the intensities of light incident into all the through hole portions 31, 32, 41 can be relatively uniform to permit uniform illumination of all the keys 27 on the keypad.

When designing the shapes of the polygonal through hole portions 31, 32, optical simulation software is used to obtain optimum shapes thereof. First, cylindrical through hole portions are disposed in positions corresponding to the keys 27 of a certain model of mobile phone. Then, the cylindrical through hole portions in the middle row 442 and closer to the proximate end 431 are modified into the polygonal through hole portions 32 having two light incident faces 321 and two reflecting faces 322.

The two light incident faces 321 are respectively oriented toward the LEDs 24. Of the light beams emitted from each LED 24, there will be a light beam passing through the center of the polygonal through hole portion 32. This light beam can be regarded as a line interconnecting the center of the polygonal through hole portion 32 and the LED 24. The face perpendicular to the interconnecting line is then selected as the light incident face 321 so that the angles of incidence of light beams incident on the light incident face 321 are preferably small angles, and are smaller than the critical angle of total internal reflection of the light incident face 321.

Figure 4:
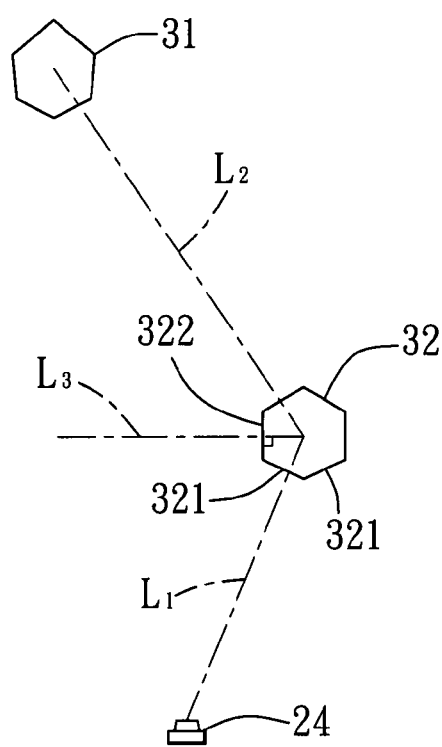
FIG. 4 is a schematic view to illustrate how a reflecting face of a polygonal through hole portion of the first preferred embodiment is determined.

The determination of the reflecting faces 322 will now be illustrated using the reflecting face 322 on the left side of the polygonal through hole portion 32, and with further reference to FIG. 4. Straight lines (L1), (L2) can be drawn to connect the center of the polygonal through hole portion 32 to the LED 24 on the left side thereof and to the center of a selected through hole portion 31 (basically, the through hole portion closest to the distal end 432 is selected). A line (L3) bisecting an angle formed between the lines (L1) and (L2) is a line normal to the reflecting face 322 to be determined, and the face perpendicular to the normal line (the bisecting line L3) is selected as the reflecting face 322. However, if the angle of incidence of light directly incident on the selected reflecting face 322 is not larger than the critical angle of total internal reflection of the selected reflecting face 322, the angle of the reflecting face 322 can be fine-tuned such that the angle of incidence of light directly incident on the selected reflecting face 322 is larger than the critical angle of total internal reflection of the selected reflecting face 322.

Referring once again to FIG. 2, the sizes of the light incident faces 311, 321, and the reflecting faces 312, 322 are determined by the intensity of light that is required to be incident into the corresponding polygonal through hole portions 31, 32 and the intensity of light that is required to be reflected. Likewise, the optimum shapes for the other polygonal through hole portions 31, 32 are determined using optical simulation described hereinabove. During the simulation process, the determined light incident faces 311, 321 and reflecting faces 312, 322 can be fine-tuned to match the light incident faces 311, 321 and reflecting faces 312, 322 that are yet to be determined so that the intensity of light incident into the through hole portions 31, 32, 41 can be made uniform.

Figure 5:
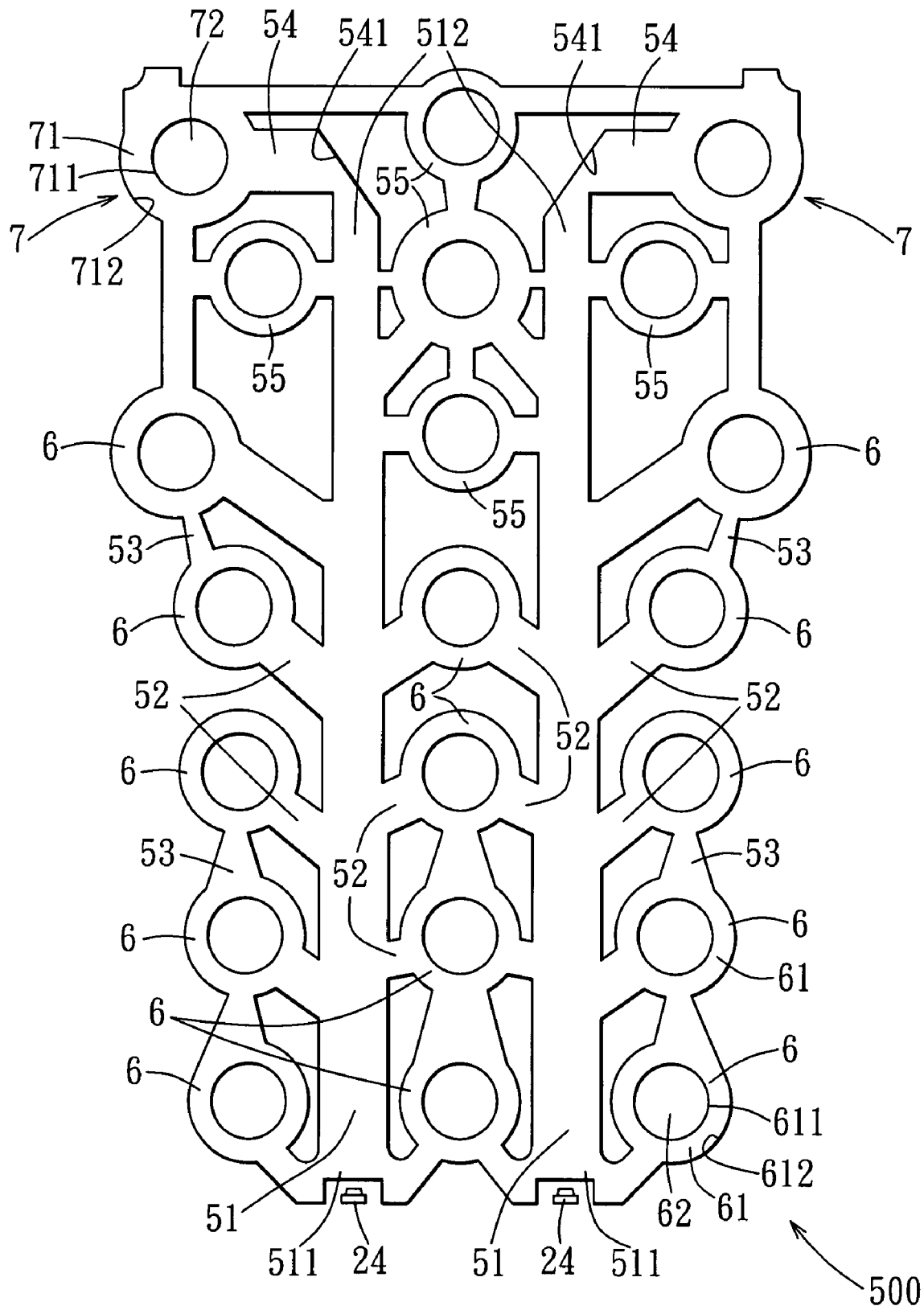
FIG. 5 is a top view to illustrate the second preferred embodiment of a light guide for use in a keypad according to the present invention.

Referring to FIG. 5, the second preferred embodiment of a light guide 500 for use in a keypad according to the present invention is shown to have a substantially tree-like structure. The light guide 500 includes two primary passage portions 51, a plurality of secondary passage portions 52, a plurality of first through hole portions 6, a plurality of auxiliary passage portions 53, two transverse passage portions 54, two second through hole portions 7, and five third through hole portions 55.

The two primary passage portions 51 are parallel to each other. Each primary passage portion 51 includes a proximate end 511 and a distal end 512. Each primary passage portion 51 has a width that decreases from the proximate end 511 to the distal end 512. The secondary passage portions 52 are disposed to branch from two opposite sides of a respective one of the primary passage portions 51 in a spaced-apart relationship, and extend obliquely toward the distal end 512 of the respective one of the primary passage portions 51. Furthermore, the secondary passage portions 52 adjacent to the proximate end 511 of the respective primary passage portion 51 are narrower than the secondary passage portions 52 distal from the proximate end 511 of the respective primary passage portion 51.

The first through hole portions 6 are disposed at distal ends of corresponding ones of the secondary passage portions 52. Each of the first through hole portions 6 is adapted to correspond to a key (not shown) on the keypad. In this embodiment, the first through hole portions 6 are arranged in three rows. Each of the first through hole portions 6 in the middle row is disposed at the distal ends of two associated secondary passage portions 52 branching respectively from the primary passage portions 51, one being the secondary passage portion 52 extending obliquely rightward from the primary passage portion 51 on the left, the other being the secondary passage portion 52 extending obliquely leftward from the primary passage portion 51 on the right. Each of the first through hole portions 6 in the left and right rows is disposed at the distal end of the respective one of the secondary passage portions 52. Each of the first through hole portions 6 includes an annular passage 61 communicated with the corresponding secondary passage portion 52, and a cylindrical through hole 62 surrounded and defined by the annular passage 61. The cylindrical through hole 62 is adapted to receive at least a part of the corresponding key on the keypad. Each annular passage 61 has an inner annular peripheral surface 611 and an outer annular peripheral surface 612.

Each of the auxiliary passage portions 53 intercommunicates some of the annular passages 61 in pairs, and has a width that decreases from the proximate end 511 of the respective primary passage portion 51 to the distal end 512 thereof. The two transverse passage portions 54 extend perpendicularly and respectively from the distal ends 512 of the primary passage portions 51. The two second through hole portions 7 are respectively disposed at distal ends of the two transverse passage portions 54, and are adapted to correspond respectively to two keys (not shown) on the keypad. Each of the second through hole portions 7 includes an annular passage 71 communicated with the corresponding transverse passage portion 54, and a cylindrical through hole 72 surrounded and defined by the annular passage 71. The cylindrical through hole 72 is adapted to receive at least a part of the corresponding key. Each annular passage 71 likewise has an inner annular peripheral surface 711 and an outer annular peripheral surface 712. Besides, an oblique face 541 is formed at a juncture between each of the primary passage portions 51 and the corresponding transverse passage portion 54.

The five third through hole portions 55 are arranged in a cross shape, and are generally provided to correspond to navigation and confirmation keys (not shown) on the keypad. As the navigation and confirmation keys can be correctly pressed without even looking, the third through hole portions 55 need not be illuminated. In this case, to maintain structural integrity of the light guide 500, it only requires relatively thin interconnections between adjacent ones of the third through hole portions 55, as well as with the primary passage portions 51 and the second through hole portions 7 associated therewith. Such interconnections are not required to have a light guiding function.

Figure 6:
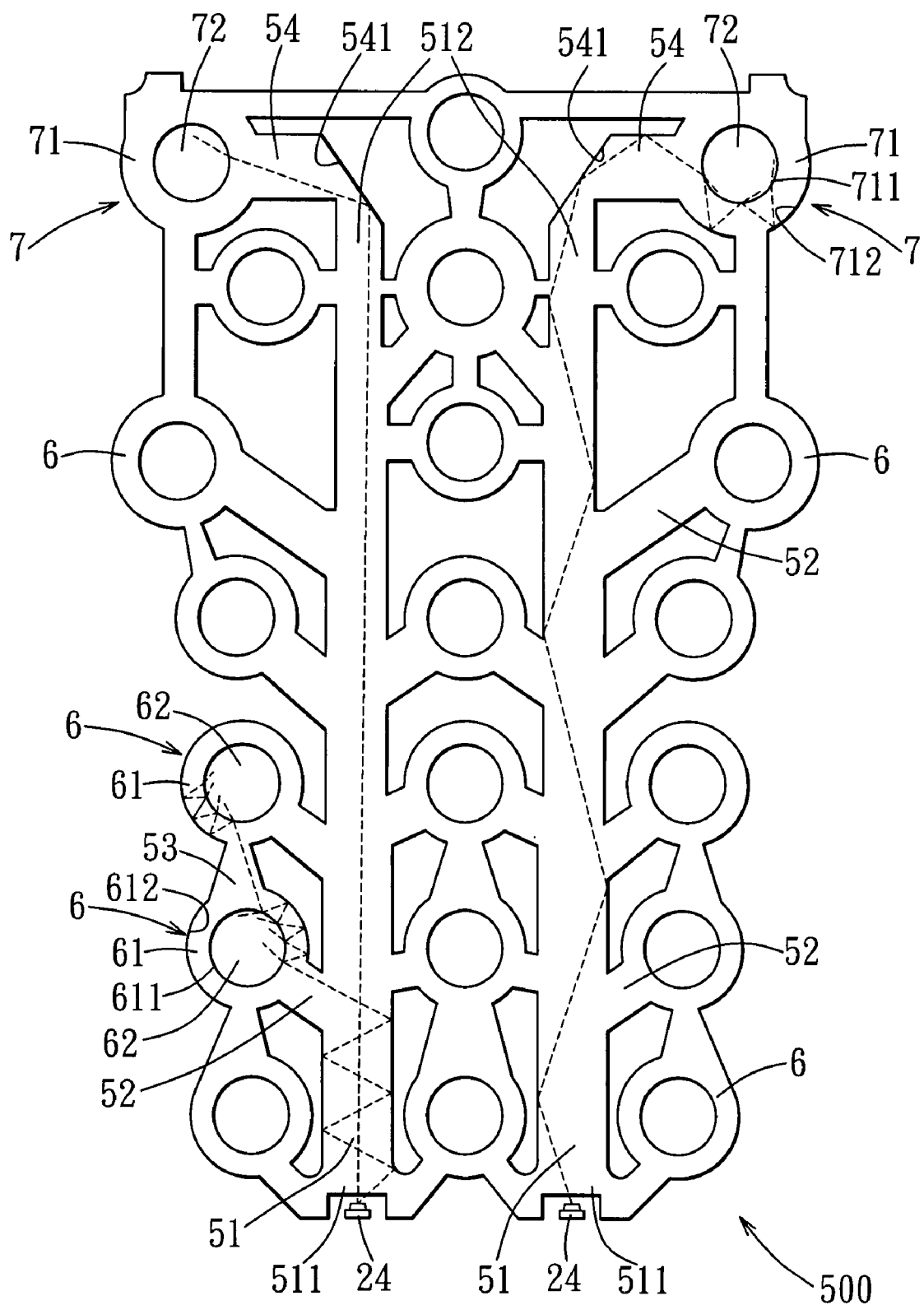
FIG. 6 is a top view to illustrate the transmission of light from two LEDs into first and second through hole portions of the light guide of the second preferred embodiment.

Referring to FIG. 6, two LEDs 24 are respectively disposed adjacent to the proximate ends 511 of the two primary passage portions 51. A portion of the light emitted from each LED 24 is transmitted along the respective primary passage portion 51 to the distal end 512 thereof, where the light is reflected by the oblique face 541 to travel into the annular passage 71 of the respective second through hole 7 via the respective transverse passage portion 54. The rest of the light traveling in each primary passage portion 51 is incident into the annular passages 61 of the corresponding first through hole portions 6 via the secondary passage portions 52. The light incident into the respective annular passages 61, 71 will undergo multiple reflections between the inner and outer annular peripheral surfaces 611, 612, 711, 712. Every time there is light incident on the inner annular peripheral surface 611, 711, a portion of the light will be refracted into the corresponding cylindrical through hole 62, 72. Therefore, light goes into the cylindrical through holes 62, 72 from different directions, thereby resulting in uniform distribution of light intensities within the cylindrical through holes 62, 72.

In addition, the arrangement of the auxiliary passage portions 53 helps guide a portion of the light within the annular passage 61 in an interconnected pair of the annular passages 61 which is closer to the proximate end 511 to the annular passage 61 of the interconnected pair which is closer to the distal end 512 such that the annular passages 61 farther from the proximate ends 511 of the primary passage portions 51 also have sufficient incident light. The arrangement of a diminishing width of the auxiliary passage portions 53 from the proximate end 511 to the distal end 512 can prevent light in the annular passages 61 farther from the proximate end 511 from entering into the respective auxiliary passage portions 53 that tends to weaken the light intensity.

Furthermore, if each of the primary passage portions 51 was configured to have a uniform width from the proximate end 511 to the distal end 512 thereof, there would be excess light directly incident into the distal end 512 thereof, which would result in over-brightness in the second through hole portions 7 and insufficient brightness in the first through hole portions 6 near the distal end 512. Therefore, the width of each primary passage portion 51 in this embodiment is configured to decrease from the proximate end 511 to the distal end 512, so as to avoid direct incidence of excess light into the distal end 512 of the respective primary passage portion 51.

Since the light intensity at the proximate ends 511 of the primary passage portions 51 is relatively strong, the width of the secondary passage portions 52 near the proximate ends 511 of the primary passage portions 51 is not required to be too large, so that there will be sufficient light entering the first through hole portions 6 near the proximate ends 511. However, with the light dispersing into the secondary passage portions 52 along the primary passage portions 51, the light at the distal ends 512 is relatively weak. Therefore, the width of the secondary passage portions 52 adjacent to the distal ends 512 is relatively large to ensure entry of sufficient light into the secondary passage portions 52. Thus, this embodiment can also achieve relatively uniform intensities of light incident into the first and second through hole portions 6, 7 to result in uniform illumination of the keys on the keypad.

In sum, the light guide 300, 500 for use in a keypad according to the present invention controls the proportion of incident light and/or reflected light by varying the sizes of the light incident faces 311, 321 and the reflecting faces 312, 322, or by varying the widths of the primary passage portions 51 and the secondary passage portions 52 according to the positions thereof. Thus, there will not be excess light entering into the through hole portions 31, 32, 41, 6 that are near the proximate ends 431, 511, and there will be sufficient light to be reflected or guided into the through hole portions 31, 32, 41, 6, 7 that are near the distal ends 432, 512. Furthermore, the polygonal through hole portions 31, 32 and the cylindrical through hole portions 41 in the first preferred embodiment will receive light that is only once-reflected after issuing from the LED 24, thereby ensuring incidence of sufficient light thereinto. Consequently, the light guide 300, 500 merely requires two LEDs 24 to achieve uniform illumination of the keys on the keypad.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A light guide adapted for use in a keypad, comprising:
a plurality of through hole portions adapted to correspond respectively to keys on the keypad, each of said through hole portions being adapted to receive at least a part of the corresponding key and to receive light incident thereinto from at least one light source, wherein each of selected ones of said through hole portions has a contour with a non-curved contour portion, said non-curved contour portion including at least one light incident face and at least one reflecting face that forms an angle with said light incident face, light incident on said reflecting face being reflected to at least one other of said through hole portions.

2. The light guide according to claim 1, wherein said light guide defines a proximate end and a distal end, the light source being disposed adjacent to said proximate end, said light incident faces slanting toward said proximate end, each of said light incident faces being arranged such that an angle of incidence of light emitted from the light source and directly incident thereon is smaller than a critical angle of total internal reflection thereof, each of said reflecting faces being arranged such that an angle of incidence of light emitted from the light source and directly incident thereon is larger than a critical angle of total internal reflection thereof.

3. The light guide according to claim 2, wherein said light guide is formed from polycarbonate.

4. The light guide according to claim 2, wherein said light guide is formed from polymethyl methacrylate.

5. The light guide according to claim 2, wherein said light incident face is perpendicular to a line interconnecting a center of the respective one of said through hole portions and the light source.

6. The light guide according to claim 2, wherein said light incident faces increase in size from said proximate end to said distal end.

7. The light guide according to claim 2, wherein said reflecting faces decrease in size from said proximate end to said distal end.

8. The light guide according to claim 2, wherein said selected ones of said through hole portions are polygonal in shape.

9. The light guide according to claim 2, wherein said through hole portions are arranged in three rows extending from said proximate end to said distal end, and including a left row, a right row, and a middle row between said left and right rows.

10. The light guide according to claim 9, wherein said through hole portions in the middle row have symmetrical left and right sides, the contour of each of said selected ones of said through hole portions which is in the middle row having two of said light incident faces and two of said reflecting faces.

11. The light guide according to claim 10, wherein said two reflecting faces of each of said selected ones of said through hole portions in the middle row are oriented toward the left and right rows, respectively.

12. The light guide according to claim 9, wherein the contour of each of said selected ones of said through hole portions which is in one of the left and right rows has one of said light incident faces, and one of said reflecting faces, said one of said reflecting faces being oriented toward the middle row.

13. The light guide according to claim 9, further comprising two triangular through hole portions that are disposed adjacent to said distal end, wherein one of said triangular through hole portions is disposed between the left and middle rows, and another one of said triangular through hole portions is disposed between the right and middle rows, each of said triangular through hole portions including two of said reflecting faces, said two of said reflecting faces slanting toward said proximate end.

14. A light guide for use in a keypad and substantially having a tree structure, said light guide comprising:
at least one primary passage portion having a proximate end and a distal end such that light emitted from at least one light source disposed adjacent to said proximate end is transmitted through said primary passage portion to said distal end;
a plurality of secondary passage portions branching from two opposite sides of said primary passage portion in a spaced-apart relationship so as to permit entry of light in said primary passage portion thereinto such that the light can travel to distal ends of said secondary passage portions; and
a plurality of through hole portions disposed respectively at said distal ends of said secondary passage portions and being adapted to correspond respectively to keys on the keypad, each of said through hole portions being adapted to receive at least a part of the corresponding key, light in each of said secondary passage portions being incident into the corresponding one of said through hole portions.

15. The light guide according to claim 14, wherein said secondary passage portions which are adjacent to said proximate end are narrower than said secondary passage portions which are distal from said proximate end.

16. The light guide according to claim 14, wherein said secondary passage portions extend obliquely toward said distal end.

17. The light guide according to claim 14, wherein each of said through hole portions includes an annular passage communicated with the respective one of said secondary passage portions, and a cylindrical through hole surrounded and defined by said annular passage, light in each of said secondary passage portions entering into said annular passage of the respective one of said through hole portions.

18. The light guide according to claim 17, wherein each of said annular passages has an inner annular peripheral surface and an outer annular peripheral surface, the light incident into said annular passage undergoing multiple reflections between said inner and outer annular peripheral surfaces, light incident on said inner annular peripheral surface being partly refracted thereby into said cylindrical through hole.

19. The light guide according to claim 17, further comprising a plurality of auxiliary passage portions intercommunicating a corresponding adjacent pair of said annular passages.

20. The light guide according to claim 19, wherein each of said auxiliary passage portions has a width that decreases from said proximate end to said distal end.

21. The light guide according to claim 14, comprising two of said primary passage portions that are parallel to each other.

22. The light guide according to claim 21, further comprising two transverse passage portions extending perpendicularly and respectively from said distal ends of said primary passage portions in opposite directions, and two through hole portions disposed at distal ends of said two transverse passage portions, respectively, each of said through hole portions being adapted to correspond to a key on the keypad and to receive at least a part of the corresponding key, an oblique face being formed at a juncture between each of said primary passage portions and the corresponding one of said transverse passage portions for reflecting light to enter the corresponding one of said transverse passage portions.

23. The light guide according to claim 14, wherein said at least one primary passage portion has a width that decreases from said proximate end to said distal end.

\* \* \* \* \*